(12) United States Patent
Choi et al.

(10) Patent No.: US 6,188,352 B1
(45) Date of Patent: Feb. 13, 2001

(54) SIGNAL PROCESSING METHOD UTILIZING AN EIGENVECTOR CORRESPONDING TO THE MAXIMUM EIGENVALUE OF AN AUTOCORRELATION MATRIX OF RECEIVED SIGNALS FOR AN ANTENNA ARRAY SYSTEM

(75) Inventors: Seung Won Choi; Hyeong Bae Lee, both of Seoul (KR)

(73) Assignees: SAS Technologies Co., Ltd.; SK Telecom Co., Ltd., both of Seoul (KR)

( * ) Notice: Under 35 U.S.C. 154(b), the term of this patent shall be extended for 0 days.

(21) Appl. No.: 09/214,066

(22) PCT Filed: Jun. 28, 1997

(86) PCT No.: PCT/KR97/00129

§ 371 Date: May 6, 1999

§ 102(e) Date: May 6, 1999

(87) PCT Pub. No.: WO98/00930

PCT Pub. Date: Jan. 8, 1998

(30) Foreign Application Priority Data

Jun. 28, 1996 (KR) .................................................. 96-25377

(51) Int. Cl.[7] ...................................................... G01S 3/16
(52) U.S. Cl. ............................................................. 342/378
(58) Field of Search ..................................... 342/378, 379

(56) References Cited

U.S. PATENT DOCUMENTS

| | | | |
|---|---|---|---|
| 4,513,383 | 4/1985 | Hackett . | |
| 5,525,997 | * 6/1996 | Kwon .................................... | 342/174 |
| 5,808,913 | * 9/1998 | Choi et al. ........................... | 364/574 |
| 5,854,612 | * 12/1998 | Kamiya et al. ...................... | 342/383 |
| 5,999,800 | * 12/1999 | Choi et al. ........................... | 342/383 |

FOREIGN PATENT DOCUMENTS 0 654 915   5/1995   (EP) .

* cited by examiner

*Primary Examiner*—Mark Hellner
(74) *Attorney, Agent, or Firm*—Lowe Hauptman Gilman & Berner, LLP

(57) ABSTRACT

This invention provides a signal processing method for enhancing the communication quality and increasing the communication capacity by reducing the effects of interference and noises with the nice beam pattern. The signal processing method provides a beam pattern by computing an eigenvector corresponding to the maximum eigenvalue of an autocorrelation matrix of received signals in an antenna array system. The inventive signal processing method introduces a simplified computational technique for generating a nice beam pattern having its maximum gain along the direction of the wanted signal and maintaining the gain toward the direction of the interfering signals in as low a level as possible.

20 Claims, 6 Drawing Sheets

SIGNAL PROCESSING METHOD UTILIZING AN EIGENVECTOR CORRESPONDING TO THE MAXIMUM EIGENVALUE OF AN AUTOCORRELATION MATRIX OF RECEIVED SIGNALS FOR AN ANTENNA ARRAY SYSTEM

TECHNICAL FIELD

This invention relates to a signal processing technique for wireless communication systems, and more particularly to a signal processing method for reducing the effect of interference and noise by controlling beam patterns in real-time, in a communication system utilizing an antenna array.

BACKGROUND ART

In general, an original signal transmitted by a certain transmitter (hereinafter, simply called a "wanted signal") is always received at a receiving set together with other plural interfering signals. Since the level of distortion in a telecommunication system is determined by the ratio between the power of the wanted signal and total power of all the interfering signals, even if the level of the wanted signal is much higher than each of the interfering signals, the distortion of the communication system can pose a serious problem when the total power of all the interfering signals proportionally increase according to when the number of the interfering signals is rather high. In conventional telecommunication systems, interfering signals make it very difficult to extract the information from the wanted signal.

Although an antenna array system has been considered as a countermeasure to improve the problems caused by the interfering signals, no practical method of synthesizing the antenna array system in an actual telecommunication systems, particularly for mobile communication systems, has yet been suggested. The problems of applying conventional antenna array systems, which is based on the method of Eigen-Decomposition, is mainly due to its complexity and operating speed which is too large for real-time processing in telecommunication systems.

The conventional technique about the antenna array system was introduced in the following references:

[1] M. Kaveh and A. J. Barabell, "The Statistical Performance of the MUSIC and Minimum-Norm Algorithms for Resolving Plane Waves in Noise," IEEE Trans., Acoust., speech and signal process., vol. ASSP-34, pp. 331–341, April 1986.

[2] T. Denidni and G. Y. Delisle, "A Nonlinear Algorithm for Output Power Maximization of an Indoor Adaptive Phased Array," IEEE Electromagnetic Compatibility, vol. 37, no. 2, pp. 201–209, May, 1995.

[3] B. G. Agee, S. V. Schell, and W. A. Gardner, "Spectral Self-Coherence Restoral: A New Approach to Blind Adaptive Signal Extraction Using Antenna Arrays", Proc. of IEEE, Vol. 78, No. 4, pp. 753–767, April 1990.

The problems in most conventional methods of designing antenna array systems are, first, it, except the method introduced in [3], requires some knowledge about the location of the wanted signal apriori, and second, it requires so many computations that real-time processing cannot be performed. Especially, when the anival angle of the wanted signal or the total number of signal sources is unknown, the required amount of computation becomes even larger, which makes it impossible to apply the conventional method of synthesizing the antenna array system to practical signal environments, such as mobile communications.

Another undesirable feature of most conventional methods of designing antenna array systems is that the performance and/or the complexity of the system to be built is affected by the coherence and/or cross correlation of the wanted signal with respect to the interfering signals. This means that the antenna array system often requires additional complexities when the signals are fully or partially coherent so that the resultant system becomes too complicated for real-time processing, which is very important, especially in mobile communications. Another conventional methods, such as the one shown in [3], do not work at all if the wanted signal cannot be extracted from the interfering signals with a particular frequency separation at a proper time lag.

This invention introduces a new signal processing technology of designing an antenna array system that provides for a nice beam pattern having its maximum gain along the direction of the wanted signal maintaining the gain along the directions of interfering signals in relatively much lower levels. Under the assumption that the wanted signal is sufficiently larger in magnitude than each of the interfering signals, the proposed technique generates the desired beam pattern without requiring any knowledge about the wanted signal as well as the interfering ones Another important and attractive aspect of the proposed technique is that the total required amount of computation is so small that the optimal parameters of the antenna array system are produced on a real-time basis. In fact, the signal processing apparatus, which forms the beamforming module of the antenna array system introduced in this invention, can easily be implemented with a normal, off the shelf, digital signal processor.

The primary objective of this invention is to introduce a new signal processing method for designing a beamforming module of an antenna array system in order to apply it at the base station of a mobile communication system for receiving and transmitting the signal of each subscriber in a cell with a nice beam pattern which is provided individually for each subscriber of the cell. The proposed technique can also be applied in other signal environments such as WLL(wireless local loop) and other fixed communications as well as mobile communications.

DISCLOSURE OF INVENTION

To solve the above mentioned problems, it is an object of the present invention to provide a signal processing method for enhancing the communication quality and increasing the communication capacity by reducing the effects of interference and noises with the nice beam pattern. The signal processing method presented in this invention provides a beam pattern by computing an eignevector corresponding to the maximum eigenvalue of an autocorrelation matrix of received signals in an antenna array system. The signal processing method introduces a simplified computational technique for generating a nice beam pattern having its maximum gain along the direction of the wanted signal and maintaining the gain toward the direction of the interfering signals in as low a level as possible.

To accomplish the object of the present invention, there is disclosed a signal processing method, comprising the steps of: (a) setting the initial estimation vector $\underline{v}(0)$ with a predetermined value, setting the initial gain vector $\underline{w}(0)$ with the normalized estimation vector, i.e., $\underline{v}(0)=\underline{x}(0)$ and $$\underline{w}(0) = \frac{\underline{v}(0)}{\|\underline{v}(0)\|},$$

and setting the snapshot index n with 1, i.e., n=1; (b) updating the autocorrelation matrix $\underline{R}_x(n)$ with a new signal vector $\underline{x}(n)$ received at the present snapshoht by $\underline{R}_x(n)$=f $\underline{R}_x(n-1)+(1-f)\underline{x}(n)\underline{x}^H(n)$, where the initial matrix is set with the initial signal vector by $\underline{R}_x(0)=\underline{x}(0)\,\underline{x}^H(0)$ and the forgetting factor f is properly set with a value between 0 and 1, ie., $0 \leq f < 1$; (c) updating the estimation vector $\underline{v}(n)$ and gain vector $\underline{w}(n)$ from the new autocorrelation matrix by $\underline{v}(n)=\underline{R}_x(n)\underline{w}(n-1)$ and $$\underline{w}(n) = \frac{\underline{v}(n)}{\|\underline{v}(n)\|},$$

respectively; (d) going to the following step (e), for more iteration in the present snapshot, or going to said step (f), for no more iteration in the present snapshot; (e) going back to said step (c), with $\underline{w}(n-1) \leftarrow \underline{w}(n)$ for more iteration in the present snapshot; and (f) generating the final array output y(n) at the present snapshot by $y(n)=\underline{w}^H(n)\underline{x}(n)$, and going back to said step, (b), with incremented snapshot index n, i.e., n←n+1, for continuing the procedure at the next snapshot.

Also, to accomplish the object of the present invention, there is disclosed a signal processing method, comprising the steps of:

(a) setting the initial estimation vector $\underline{v}(0)$ with a predetermined value, setting the initial gain vector $\underline{w}(0)$ with the normalized estimation vector, i.e., $\underline{v}(0)=\underline{x}(0)$ and $$\underline{w}(0) = \frac{\underline{v}(0)}{\|\underline{v}(0)\|},$$

and setting the snapshot index n with 1, i.e. n=1;

(b) Receiving a new signal vector $\underline{x}(n)$ at the present snapshoht;

(c) updating the estimation vector $\underline{v}(n)$ and gain vector $\underline{w}(n)$ from the new signal vector by $\underline{v}(n)$=f $\underline{v}(n-1)+(1-f)\underline{x}(n)\underline{x}^H(n)\underline{w}(n-1)$ and $$\underline{w}(n) = \frac{\underline{v}(n)}{\|\underline{v}(n)\|},$$

respectively, where the forgetting factor f is properly set with a value between 0 and 1, i.e., $0 \leq f < 1$;

(d) going to the following step (e), for more iteration in the present snapshot, or going to said step (f), for no more iteration in the present snapshot;

(e) going back to said step (c), with $\underline{v}(n-1) \leftarrow \underline{v}(n)$ and $\underline{w}(n-1) \leftarrow \underline{w}(n)$ for more iteration in the present snapshot;

(f) generating the final array output y(n) at the present snapshot by $y(n)=\underline{w}^H(n)\underline{x}(n)$, and going back to said step (b), with incremented snapshot index n, i.e., n←n+1, for continuing the procedure at the next snapshot.

Also, to accomplish the object of the present invention, there is disclosed a signal processing method, comprising the steps of: (a) setting the initial estimation vector $\underline{v}(0)$ with the initial signal vector $\underline{x}(0)$, setting the initial gain vector $\underline{w}(0)$ with the normalized estimation vector, i.e., $\underline{v}(0)=\underline{x}(0)$ and $$\underline{w}(0) = \frac{\underline{v}(0)}{\|\underline{v}(0)\|},$$

and setting the snapshot index n with 1, ie., n=1; (b) receiving a new signal vector $\underline{x}(n)$ at the present snapshoht; (c) updating the estimation vector $\underline{v}(n)$ and gain vector $\underline{w}(n)$ from the new signal vector by $\underline{v}(n)$=f $\underline{v}(n-1)+(1-f)\underline{x}(n)\underline{x}^H(n)$ $\underline{w}(n-1)$ and $$\underline{w}(n) = \frac{\underline{v}(n)}{\|\underline{v}(n)\|},$$

respectively, where the forgetting factor f is properly set with a value between 0 and 1, i.e., $0 \leq f < 1$; (d) generating the final array output y(n) at the present snapshot by $y(n)=\underline{w}^H(n)$ $\underline{x}(n)$, and going back to the second step, (b), with incremented snapshot index n, i.e., n←n+1, for continuing the procedure at the next snapshot.

BRIEF DESCRIPTION OF DRAWINGS

The novel features believed characteristic of the invention, as well as other features and advantages thereof, will best be understood by reference to the following detailed description of a particular embodiment, read in connection with the accompanying drawings, wherein.

BEST MODE FOR CARRYING OUT THE INVENTION

Figure 1:
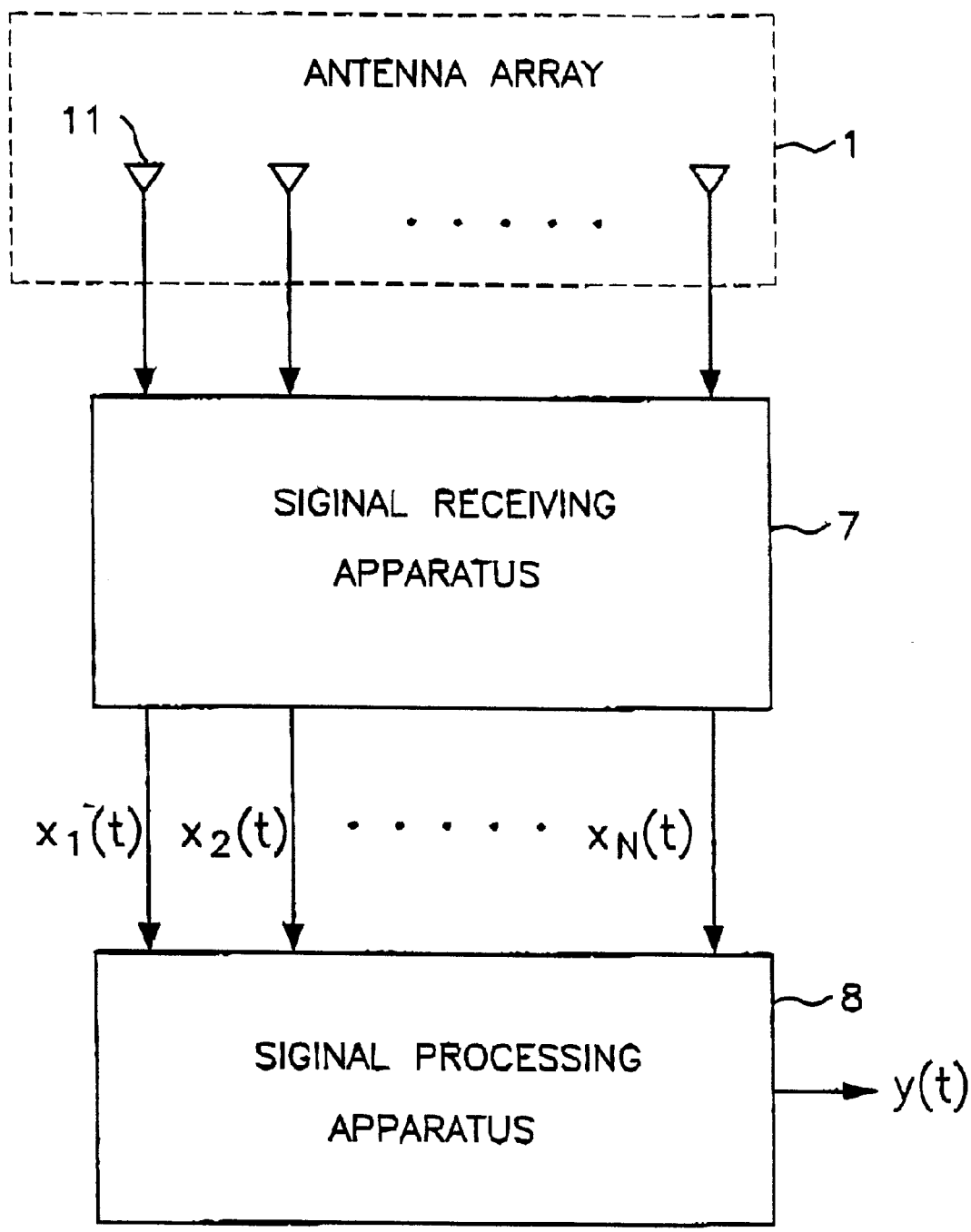
FIG. 1 is a block diagram of an antenna array system that adopts a signal processing method according to the present invention.

A preferred embodiment of the present invention will be explained below with reference to the accompanying drawings.

The signal processing method that is proposed in this invention generates a proper gain vector $\underline{w}$, (which is often called weight vector as well), that provides a beam pattern having its maximum gain along the direction of the wanted signal maintaining the gain in the other directions in as low a level as possible. This can be accomplished in one of two approaches.

The first approach for providing the nice beam pattern is to optimize the value of the complex gain that is to be multiplied to each signal received at each antenna element, and the other approach is to optimize the value of the phase delay that is to be added to each signal received at each antenna element. Since each element of the gaion vector in the first approach is to be weighted (multiplied) to each element of the signal vector, the gain vector is often referred to as "weight vector" as well.

Only the first approach is explained in detail in this document because of the following two reasons: first, those two approaches are mathematically equivalent, second, the second approach is more costy in hardware and the beamforming performance of the second approach is inferior to the first one in terms of angle accuracy. However, the second approach can easily be implemented by utilizing the procedure explained in this invention. Therefore a signal processing method that is implemented in the second approach should be a part of this invention as long as it utilizes the idea introduced in this document In other words, this invention determines the complex gain vector "$\underline{w}$" in such a way that the desired beam pattern is formed, and as a result, the output of the array antenna system, i.e., the Euclidean inner product of the signals induced at the antenna elements and the complex gain vector, should be as close to the wanted value as possible.

If the magnitude of every element of the complex gain vector is normalized to 1, to multiplying the signal received at each antenna element by the corresponding element of the complex gain vector $\underline{w}$ is equivalent to adding the phase delay to the signal by the amount of the phase term of each corresponding element of the complex gain vector. Therefore, multiplying the signal vector by the gain vector is equivalent to adding the phase of the signal vector by the amount of the phase term of the gain vector.

As mentioned above, the same effect can also be obtained by appending the time delay to the signal received at the i__th antenna element by the amount of $\phi_i$ divided by $2\pi f_c$, where $\phi_i$ and $f_c$ denote the phase delay to be added to the signal received at the i__th antenna element and the carrier frequency, respectively.

For a linear array system having a uniform spacing of $$\frac{\lambda_c}{2}$$

between adjacent antenna elements, where $\lambda_c$ denotes the wavelength at the carrier frequency, the signal induced at the m__th antenna element can be represented after the frequency down conversion as follows:

$$x_m(t) = \sum_{k=1}^{M} S_k(t)e^{j(m-1)\pi\sin\theta_k} + n_m(t). \tag{1}$$

where $\theta_k$ denotes the incident angle of the k__th signal and $S_k(t)$ is the k__th transmitted signal observed at the receiving end.

The subscript m in equation (1) represents the antenna element. The reference antenna element is assigned to be m=1 and the other antenna elements are assigned the next numbers, i.e., m=2, 3, . . . , in the order of the magnitude of the phase of the signal induced at each antenna element.

In eq. (1), one of the M signals is the wanted signal. For example, when $S_1(t)$ is the wanted signal it must be received at the antenna array system while all the other M−1 signals, i.e., $S_2(t)$, $S_3(t)$, . . . , $S_M(t)$, are interfering signals to be rejected, together with the noise $n_m(t)$, for a good signal reception. Although eq. (1) is valid for the linear array with the uniform half-wavelength spacing, the technique provided in this invention can be generally applied to non-uniform spacing or non-linear array systems as well.

For non-uniform spacing arrays, if the distance of the m__th antenna element from the reference antenna element is $d_m$, then there exists a phase difference in the signal induced at the m__th antenna element by $$2\pi \frac{d_m}{\lambda_c}\sin\theta_k$$

compared to the phase of the signal at the reference antenna element. Thus, the signal induced at the m__antenna element for non-uniform and/or non-linear array systems can be written as follows;

$$x_m(t) = \sum_{k=1}^{M} S_k(t)e^{j2\pi\frac{d_m}{\lambda_c}\sin\theta_k} + n_m(t).$$

In this invention, in order to make the phase delay to be appended at each antenna element be a positive quantity, the reference antenna element is defined as the antenna element at which the induced signal has the latest phase in the receiving array. In the transmitting array system, therefore, the antenna element at which the induced signal has the earliest phase is the reference antenna element. Defining the reference antenna element in the way explained above, the array antenna system can easily be designed by appending the zero phase delay to the signal at the reference antenna element and the proper positive amount of the phase delay to the signal at the other antenna elements. For an array antenna system consisting of N antenna elements, the array receives the N-by-1 signal vector at every snapshot. The autocorrelation matrix of the received signals can be written as shown in eq (2).

The term "snapshot" in this document denotes the time period during which the new gain vector (or, phase delay vector) is computed upon receiving the new signal vector. In this invention, the array antenna system that adapts to the new signal vector can be designed at each snapshot by determining the proper gain vector (or, phase delay vector) for each new signal vector received at every snapshot $$\underline{R}_x(J) = \frac{1}{J}\sum_{l=1}^{J} \underline{x}(t+1T_s)\underline{x}^H(t+1T_s) \tag{2}$$

where the underlined quantities denote the vector or matrix, $T_s$ is the snapshot period and superscript H is the Hermitian operator. The N-by-1 signal vector $\underline{x}(t)$, of which the number of elements is N, consists of the received signal $x_m(t)$ for m=1, 2, . . . , N, which is explained in eq.(1) as follows:

$$\underline{x}(t)=[x_1(t)x_2(t) \ldots x_N(t)]^T \tag{3}$$

where superscript T denotes the transpose operator.

However, eq. (2) is valid only when the arrival angles of all the signal components remain unchanged. In a time-varying environment where each signal source moves during the communication, as in the mobile communication environment, the autocorrelation matrix cannot be obtained by eq. (2) because the arrival angle of the signal source changes at every snapshot.

Therefore, in time-varying signal environments, it is recommended that the autocorrelation matrix be computed in an iterative manner as follows:

$$\underline{R}_x(J+1)=f\cdot\underline{R}_x(J)+\underline{x}((J+1)T_s)\underline{x}^H((J+1)T_s) \tag{4}$$

where $\underline{R}_x(J+1)$ and $\underline{R}_x(J)$ denote the autocorrelation matrix at the J+1st and J_th snapshot, respectively, and f denotes the forgetting factor in the range between 0 and 1. Since communication environments, especially mobile communications, are generally time-varying environments, the autocorrelation matrix in this invention is computed by eq. (4) rather eq. (2).

From various computer simulations, it is recommended to set the value for the forgetting factor, f, in the range between 0.8 and 0.99 for optimal performances in land mobile communications.

Now, the design of the optimal array antenna system will be explained in more detail by taking the practical examples of actual applications. The eigenvalues $\{\lambda_i\}$ of the autocorrelation matrix, determined by eq. (2) or (4), can be sorted by the magnitude as $\lambda_1 \geq \lambda_2 \geq \ldots \geq \lambda_N$. The largest eigenvalue $\lambda_i$ is determined by the signal components, not the noise components, regardless of the number of signal sources or antenna elements.

Therefore, the eigenvector corresponding to the largest eigenvalue $\lambda_1$ exists in the signal subspace as follows:

$$\underline{e} = \sum_{i=1}^{M} \xi_i \underline{a}(\theta_1) \tag{5}$$

where the complex quantity $\epsilon_i$ is a constant determined by the magnitudes and distribution of the wanted and interfering signals, and the vector $\underline{a}(\theta i)$ is the steering vector of the i_th signal component in the following form:

$$\underline{a}(\theta i) = [1 e^{j\pi \sin \theta_i} \ldots e^{j(N-1)\pi \sin \theta_i}] \tag{6}$$

Now, suppose the magnitude of the wanted signal is sufficiently larger than each of the interfering signals such that the condition shown in (7) is satisfied.

$$|S_1(t)| >> |S_i(t)| \tag{7}$$

for $i \neq 1$

In a signal environment in which condition (7) is satisfied, the eigenvector $\lambda_1$ corresponding to the largest eigenvalue can be approximated as:

$$\underline{e}_1 = \xi_1 \underline{a}(\theta_1). \tag{8}$$

This means that the steering vector, $a(\theta_1)$, of the wanted signal is almost the same as the eigenvector correspond to the largest eigenvahle, except that the complex-valued constant, $\epsilon_1$, is multiplied Therefore, under the condition that the wanted signal is sufficiently larger than each of interfering signals, the maximum gain of the array antenna system will approximately point to the direction of the source of the wanted signal if the gain vector to be appended to the antenna elements of the array system is determined by the eigenvector corresponding to the largest eigenvalue of the autocorrelation matrix of the signals impinging upon the array system.

In conclusion of the above discussions, this invention suggests that the gain vector can be determined by the following equation:

$$\underline{w} = \frac{1}{\sqrt{N}} \underline{e}_1. \tag{9}$$

Now, the practical way of computing the optimal weight vector is presented. As mentioned previously, under a particular signal environment where the wanted signal is sufficiently larger than each of interfering signals, the array antenna system having the desired beam pattern, which provides the maximum gain along the direction of the wanted signal source, can be obtained by taking the weight vector $\underline{w}$ with a normalized eigenvector $\underline{e}_1$ corresponding to the largest eigenvalue $\lambda_1$ of the autocorrelation matrix. However, to obtain the autocorrelation matrix itself requires a lot of computations, as shown in eqs. (2) and (4). Moreover, it is not a simple task to compute the eigenvector corresponding to the largest eigenvalue of the matrix. What makes the problem even more complicated is that the arrival angle of each signal changes at every snapshot in mobile communications such that the eigenvector to be obtained varies at every snapshot.

Considering the time-varying signal environment, this invention introduces a method of computing the weight vector $\underline{w}$ with the approximated value for the eigenvector $\underline{e}_1$ in an iterative way. This means that the weight vector obtained at the last snapshot is updated at the next snapshot upon the reception of a new signal vector that contains time-varying statistics mainly due to the different arrival angles at each snapshot. The iterative procedure for determining the weight vector with a normalized eigenvector corresponding to the maximum eigenvalue of the autocorrelation matrix is described in detail in the remainder of this section.

In general the eigenvector corresponding to the maximum eigenvalue of a matrix can be obtained by the method known as "Power Series Method" (abbreviated as "PSM" in the remainder of this document), of which the basic concept can be found in many textbooks of linear algebra. Since the signal environment considered in this invention is such that the wanted signal is much larger than each of interfering signals, the above mentioned technique of PSM can produce the target eigenvector with relative efficiency. The mathematical details about the PSM is given in the follow textbook:

[4] Howard Anton, *Elementary Linear Algebra*: Chapter 8, Section 3, John Wiley & Sons Inc., 1984.

The key part of this invention is to provide a simple procedure for computing an approximated eigenvector of the largest eigenvalue of the autocorrelation matrix that must be updated at each snapshot upon the reception of a new signal vector of the antenna array system. For a given matrix $\underline{R}$, the procedure of determining the weight vector with the target eigenvector by means of the PSM can be summarized as given in [4] as follows:

<step 1> Set an initial estimation vector $\underline{v}(0)$ avoiding zero vector.

<step 2> Update the estimation vector by multiplying the present estimation vector $\underline{v}(n)$ to the autocorrelation matrix, i.e., $\underline{v}(n+1) = \underline{R}\underline{v}(n)$.

<step 3> Determine whether or not the computation of the estimation vector is repeated for more accuracy. Go back to <step 2> with $\underline{v}(n) \leftarrow \underline{v}(n+1)$ for repeatition, otherwise, go to the following step, i.e., <step 4>.

<step 4> Generate the weight vector $\underline{w}(n+1)$ by normalizing the estimation vector obtained in the last step, i.e., $\underline{w}(n+1) = \underline{v}(n+1)/\|\underline{v}(n+1)\|$.

The eigenvector corresponding to the largest eigenvalue can be obtained in a finite number of iterations from the above-written procedure unless there exists more than one larger eigenvalues in the given matrix. Also, as mentioned previously, since the wanted signal is assumed to be much larger in magnitude than each of interfering signals, the target vector can be obtained in relatively small number of repetitions. A serious problem, however, in the above-written procedure is that a matrix multiplication is required in computing the target eigenvector, as shown in <step 2>. It means that, if L_times repeated computations for a given matrix is required, then the amount of computation due to the matrix multiplication in <step 2> would be proportional to $O(LN^2)$. Furthermore, the above-written procedure consisting of 4 steps is applicable for obtaining the target eigenvector only after the autocorrelation matrix has been computed. Therefore, in order to apply the PSM to compute the weight vector, some additional steps must be performed successfully for receiving a signal vector and updating the autocorrelation matrix based on the new signal vector prior to the above-written procedure of PSM. Consequently, it seems to be impossible to apply the procedure of PSM, shown above, to the problem of designing a practical antenna array system, considering the total required amount of computation for the reception of a new signal vector, computation of an autocorrelation matrix based on this new signal vector, and perfoming the above-mentioned 4 steps of PSM. In order to compensate for the disadvantages of the original PSM mentioned above, this invention provides a simplified procedure in which the matrix operation in <step 2> can be approximated with proper vector operations. Also, the method proposed in this invention suggests an efficient way of setting the initial value of the estimation vector $\underline{v}(0)$ from the signal vector received at the initial snapshot $\underline{x}(0)$.

As can be verified easily, the required number of iterations for computing the target eigenvector for a given matrix can significantly be reduced by selecting the signal vector itself as the initial value for the estimation vector at the very first snapshot, i.e., $\underline{v}(0)=\underline{x}(0)$. The basic reason is that the signal vector $\underline{x}(0)$ itself must be a good approximation for the eigenvector corresponding to the largest eigenvalue at the first snapshot because there must only be one signal eigenvector, meaning that the rank of the autocorrelation matrix at the very first snapshot is one. Starting from the initial estimation vector being set with the signal vector itself, i.e., $\underline{v}(0)=\underline{x}(0)$, the required number of iterations at each snapshot for achieving a given accuracy can be significantly reduced. In fact, it has been found in various computer simulations that the target eigenvector can be obtained with a reasonably good accuracy in only one iteration at each snapshot, which means no repeated computation is required at each snapshot once the initial value for the stimulation vector is set with the signal vector at the initial snapshot.

Another defective feature of the original procedure of the PSM given in [4] is that, as mentioned previously, the matrix multiplication must be performed at step 2 at each iteration for a given matrix. Since the matrix itself must be updated upon the reception of a new signal vector, the total required amount of computation seems to be too large for real-time processing of practical mobile communication signals.

The signal processing method for computing the eigenvector corresponding to the largest eigenvalue proposed in this invention improves the above-mentioned procedure of the PSM in such a way that the target vector is obtained in an adaptive manner with a relatively much simpler computational load.

The autocorrelation matrix is updated whenever a new signal vector is received, as shown in eq.(4) which is rewritten as:

$$\underline{R}(n)=f\underline{R}_x(n-1)+(1-f)\underline{x}(n)\underline{x}^H(n) \tag{4}$$

where f is a forgetting factor of which the value is predetermined in between 0 and 1, i.e., $0 \leq f < 1$. The new estimation vector $\underline{v}(n)$ is obtained by multiplying the weight vector computed in the last previous snapshot $\underline{w}(n-1)$ by the matrix updated with a new signal vector as shown in eq. (4), i.e., $\underline{v}(n)=\underline{v}(n)=\underline{R}(n)\underline{w}(n-1)$. If the weight vector of the previous snapshot was computed successfully, since the magnitude of the wanted signal is much larger than each of interfering signals in the signal environment considered in this invention, the weight vector $\underline{w}(n)$ approaches the eigenvector corresponding to the largest eigenvalue of the autocorrelation matrix through the repeated procedure of the matrix multiplication $\underline{v}(n)=\underline{R}_x(n)\underline{w}(n-1)$ and normalization of the estimation vector $\underline{w}(n)=\underline{v}(n)/|\underline{v}(n)|$. The required number of repetitions of matrix multiplication and normalization depends on the accuracy of the initial setting for the estimation vector $\underline{v}(0)$ and how much larger the maximum eigenvalue compares to each of the other eigenvalues. As mentioned earlier, this invention suggests that the initial value for the estimation vector be set with the initial signal vector, i.e., $\underline{v}(0)=\underline{x}(0)$.

The above statements present a procedure of computing the weight vector to be applied as a gain vector to antenna elements in an adaptive manner. This means that the weight vector is obtained at each snapshot based on the solution computed in the last snapshot starting from the initial setting at the very first snapshot. However, as for the complexity of the entire procedure, it still includes the matrix operation $\underline{v}(n)=\underline{R}_x(n)\underline{w}(n-1)$ which should be performed as many times as the number of iterations at each snapshot.

Developing a simplified procedure considering mainly the matrix operation $\underline{v}(n)=\underline{R}_x(n)\underline{w}(n-1)$, the matrix operation can be written as follows:

$$\underline{v}(n)=\underline{R}_x(n)\underline{w}(n-1)=(f\underline{R}_x(n-1)+(1-f)\underline{x}(n)\underline{x}^H(n)\underline{w}(m-1). \tag{10}$$

In the meantime, in computing the autocorrelation matrix at each snapshot, as in eq.(4), it has been found in various computer simulations that the term (1−f) can be ignored without affecting the performance of the system. Thus, in the remainder of this document, the term (1−f) will not be shown in equations.

The two terms of the right side of eq.(10), i.e., $f\underline{R}_x(n-1)\underline{w}(n-1)$ and $\underline{x}(n)\underline{x}^H(n)\underline{w}(n-1)$, can be thought separately as follows.

If the weight vector at the last previous snapshot $\underline{w}(n-1)$ was computed successfully, the first term $\underline{R}_x(n-1)\underline{w}(n-1)$ can be written as $$\underline{R}_x(n-1)\underline{w}(n-1) \approx \lambda_1 \underline{w}(n-1) \tag{11}$$

where $\lambda_1$ is the maximum eigenvalue of the autocorrelation matrix at the previous snapshot $\underline{R}_x(n-1)$. But, once the weight vector $\underline{w}(n-1)$ approximates to an eigenvector corresponding to the maximum eigenvalue of the matrix at the previous snapshot, $\lambda_1$ is approximately equal to $\|\underline{v}(n-1)\|$. Then, eq.(11) can be written as $$\underline{R}_x(n-1)\underline{w}(n-1) \approx \lambda_1 \underline{w}(n-1) \approx \|\underline{v}(n-1)\|\underline{w}(n-1)=\underline{v}(n-1). \tag{12}$$

Therefore, eq.(10) that includes a matrix multiplication can be simplified into a vector equation as follows:

$$\underline{v}(n) = \underline{R}_x(n)\underline{w}(n-1) \approx f \underline{v}(n-1) + \underline{x}(n)\underline{x}^H(n)\underline{w}(n-1). \quad (13)$$

The procedure of computing a normalized eigenvector corresponding to the largest eigenvalue of the autocorrelation matrix at each snapshot can be summarized in a simplified form as follows:

<step 1> Set the initial estimation vector $\underline{v}(0)$ and initial gain vector $\underline{w}(0)$ with the initial signal vector $\underline{x}(0)$ and the normalized initial estimation vector, respectively, i.e., $\underline{v}(0) = \underline{x}(0)$ and $$\underline{w}(0) = \frac{\underline{v}(0)}{\|\underline{v}(0)\|},$$

and set the snapshot index n with 1, i.e., n=1.

<step 2> Receive a new signal vector $\underline{x}(n)$ at the present snapshot.

<step 3> Update the estimation vector $\underline{v}(n)$ and gain vector $\underline{w}(n)$ from the new signal vector by $\underline{v}(n) = f \underline{v}(n-1) + (1-i)\underline{x}(n)\underline{x}^H(n)\underline{w}(n-1)$ and $$\underline{w}(n) = \frac{\underline{v}(n)}{\|\underline{v}(n)\|},$$

respectively, where the forgetting factor f is properly set with a value between 0 and 1, i.e, $0 \leq f < 1$.

<step 4> Go to <step 5> for more iteration in the present snapshot, or go to <step 6> for no more iteration in the present snapshot.

<step 5> Go back to <step 3> with $\underline{v}(n-1) \leftarrow \underline{v}(n)$ and $\underline{w}(n-1) \leftarrow \underline{w}(n)$ for more iteration in the present snapshot.

<step 6> Generate the final array output y(n) at the present snapshot by $y(n) = \underline{w}^H(n)$, and go back to <step 2> with incremented snapshot index n, i.e., $n \leftarrow n+1$, for continuing the procedure at the next snapshot.

The repeated iteration at a snapshot may not be required in some signal environments, e.g., when the wanted signal is sufficiently larger than each of interfering signals. In this signal environment, the above procedure can be set more simply as follows:

<step 1> set the initial estimation vector $\underline{v}(0)$ and initial gain vector $\underline{w}(0)$ with the initial signal vector $\underline{x}(0)$ and the normalized estimation vector, i.e., $\underline{v}(0) = \underline{x}(0)$ and $$\underline{w}(0) = \frac{\underline{v}(0)}{\|\underline{v}(0)\|},$$

and set the snapshot index n with 1, i.e., n=1.

<step 2> Receive a new signal vector $\underline{x}(n)$ at the present snapshot.

<step 3> Update the estimation vector $\underline{v}(n)$ and gain vector $\underline{w}(n)$ from the new signal vector by $\underline{v}(n) = f \underline{v}(n-1) + (1-f)\underline{x}(n)\underline{x}^H(n)\underline{w}(n-1)$ and $$\underline{w}(n) = \frac{\underline{v}(n)}{\|\underline{v}(n)\|},$$

respectively, where the forgetting factor f is properly set with a value between 0 and 1, i.e., $0 \leq f < 1$.

<step 4> Generate the final array output y(n) at the present snapshot by $y(n) = \underline{w}^H(n)\underline{x}(n)$, and go back to <step 2> with incremented snapshot index n, i.e., $n \leftarrow n+1$, for continuing the procedure at the next snapshot.

It has been found in various computer simulations that the signal-to-(total)interference ratio (SIR) of the antenna array system adopting the proposed PSM can be improved by up to 8 or 10 dB compared to a single antenna system when the number of antenna elements in the array system is 12. The major factors that determine the amount of improvement in SIR are, firstly, whether the weight vector is produced from the autocorrelation matrix obtained by eq.(4) at every snapshot or it is produced through the simplified procedure shown in eq.(13), and secondly, whether or not there are enough number of iterations for computing the weight vector is assigned at each snapshot The signal-to-noise ratio (SNR) is improved as the number of antenna elements of the array system increases, i.e., the SNR at the output of the array system is N times the input SNR.

Figure 3A:
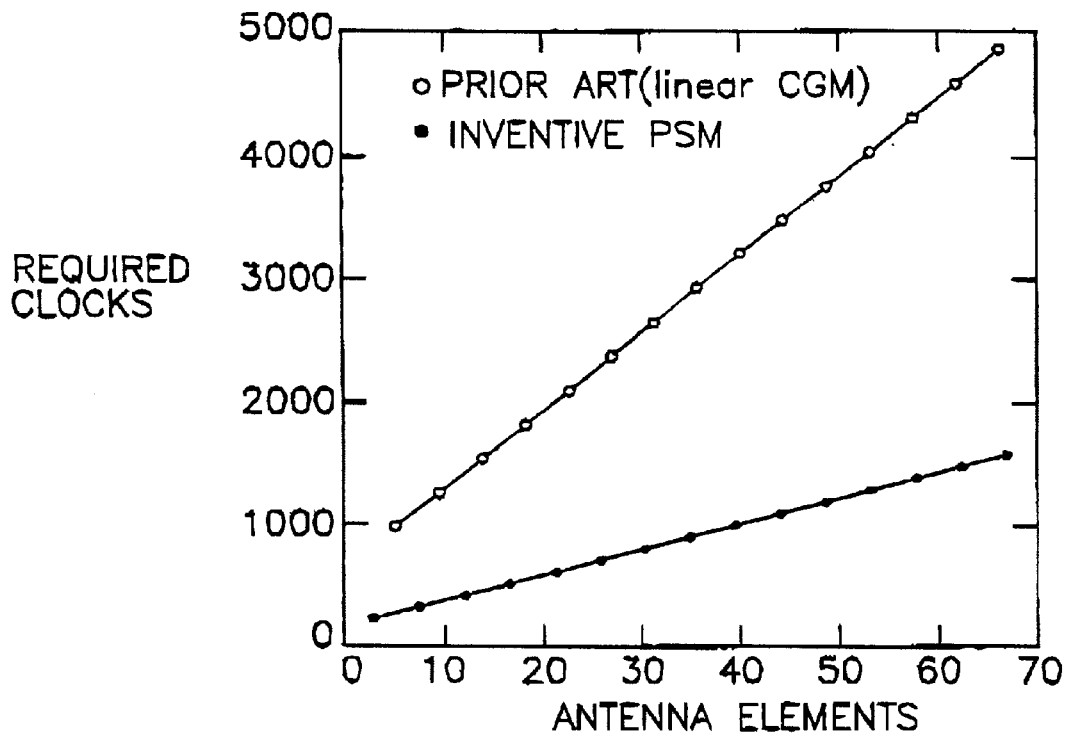
FIG. 3A shows the number of clocks required to obtain the target weight vector by utilizing a microprocessor.
Figure 3B:
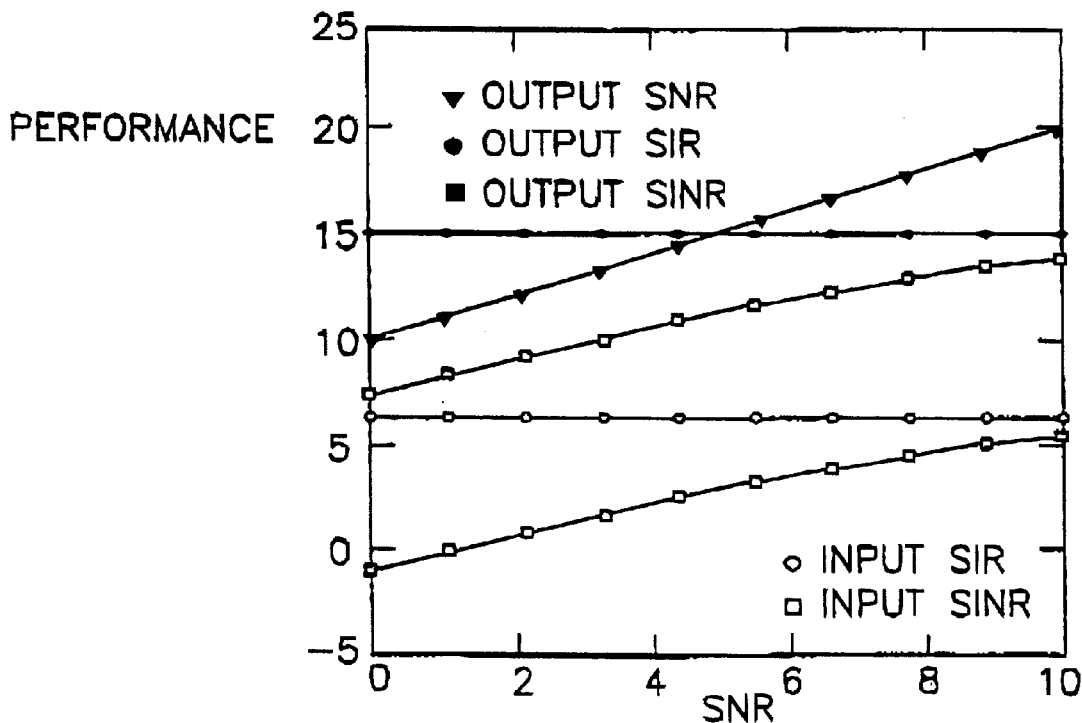
FIG. 3B shows the SIR and SNR performances of the antenna array system designed by the method presented in this invention.

FIG. 3 illustrates the performance of the antenna array system designed by the PSM presented in this invention. FIG. 3A shows the number of clocks required to obtain the target weight vector by utilizing a microprocessor. In the simulations for the data of FIG. 3A, a digital signal processor, for example TMS320C30, has been selected arbitrarily. The required number of docks in FIG. 3A is shown in comparison to another technique, namely a modified conjugate gradient method, that has been developed most recently. FIG. 3B shows the SM and SNR performances of the antenna array system designed by the method presented in this invention. As illustrated in the figure, the proposed system provides about 8 dB improvement in SIR. The SNR, as mentioned earlier, is improved linearly as the number of antenna elements in the array increases. From the performance shown in FIG. 3, it is apparent that the antenna array system designed by the proposed method is excellent in terms of both performance and complexity.

The amount of computation required to obtain the weight vector by the proposed method is, as can be counted from the procedure shown previously, about $O(2N^2+2N)$ or $O(5N)$, depending on whether the autocorrelation matrix is actually computed by eq (4) or the approximation procedure of eq.(13) is invoked at each snapshot, respectively. As mentioned previously, the repeated computation of the weight vector at each snapshot is not necessary when the initial estimation vector is set with the initial signal vector, as suggested in this invention. The primary reason for the repeated iteration at a snapshot not to be necessary is that, as mentioned previously, the wanted signal is assumed to be much larger than each of interfering signals. This condition is naturally satisfied in CDMA (Code Division Multiple Access) mobile communications because, at each receiving card of the base station, the received signal, consisting of every subscriber's transmitted signal, is cross-correlated with the code sequence of which the subscriber's signal is to be received. Therefore, after performing the cross-correlation with the code sequence of a to-be-received subscriber, the wanted signal must be much larger than each of the other subscribers' signals. If the proposed method of designing the antenna array system is applied to CDMA base station, the required condition is automatically satisfied at the output of the cross-correlator of each receiving card. More exactly speaking, in CDMA mobile communications, after the cross-correlation, the wanted signal becomes larger than each of interfering signals by PG times, where PG denotes the processing gain of the CDMA system, i.e., the ratio between the chip rate of the code sequence and bit rate of the original data.

In order to implement a total antenna array system that encounters both the receiving and transmitting modes, the weight vector computed during the receiving mode by utilizing the procedure shown in this invention can be used during the transmitting mode. As mentioned earlier, the signal processing method of computing the weight vector of an antenna array system presented in this invention can significantly enhance the communication quality and increase the communication capacity. It can also extend the life time of the battery at each subscriber because the base station adopting the proposed antenna array system receives the signal from each subscriber very efficiently with the nice beam pattern which provides its maximum gain along the direction of each target subscriber.

Now, a more detailed explanation of the proposed apparatus and method will follow by taking practical examples.

FIG. 1 illustrates a conceptual block diagram of an antenna array system that adopts a signal processing method disclosed in this invention, As shown in the FIGURE, the antenna array system according to the present invention comprises an antenna array 1 consisting of plural antenna elements 11, a signal-receiving apparatus 7 generating said signal vector $\underline{x}$ at each snapshot; and a signal processing apparatus 8 generating said weight (or, gain) vector $\underline{w}$.

The antenna array 1 consists of plural antenna elements. The signal induced at each antenna element encountering a phase delay in accordance with the incident angles includes all the signals each of which is transmitted from a subscriber in the cell. The signal-receiving apparatus 7 takes the signals from the antenna array 1. The signal-receiving apparatus 7 includes common signal-receiving procedures such as low noise amplification, frequency-down conversion, quasi-quadrature detection, etc,. that are necessary to generate the signal vector $\underline{x}$, each element of which represents the in-phase and quadrature component of the received signal. When the method proposed in this invention is applied in CDMA communications, the signal-receiving apparatus 7 includes said cross-correlator that cross-correlates each received signal with said code sequence of the subscriber of which the transmitted signal is to be received. The output of the signal-receiving apparatus 7 forms the signal vector $\underline{x}$ and is connected to the signal processing apparatus 8.

The signal processing apparatus 8 first generates the weight vector $\underline{w}$ by processing the signal vector $\underline{x}$ through the procedure presented in this invention. Then, the weight vector is used to generate the final output y of the antenna array system by performing the Euclidean inner product of the signal vector $\underline{x}$ and weight vector $\underline{w}$, i.e., $y=\underline{w}^H\underline{x}$, at each snapshot. The key part of the antenna array system shown in FIG. 1 is the signal processing apparatus 8. It produces the weight vector $\underline{w}$ at each snapshot that provides a nice beam pattern having its maximum gain along the direction of target signal source.

Figure 2A:
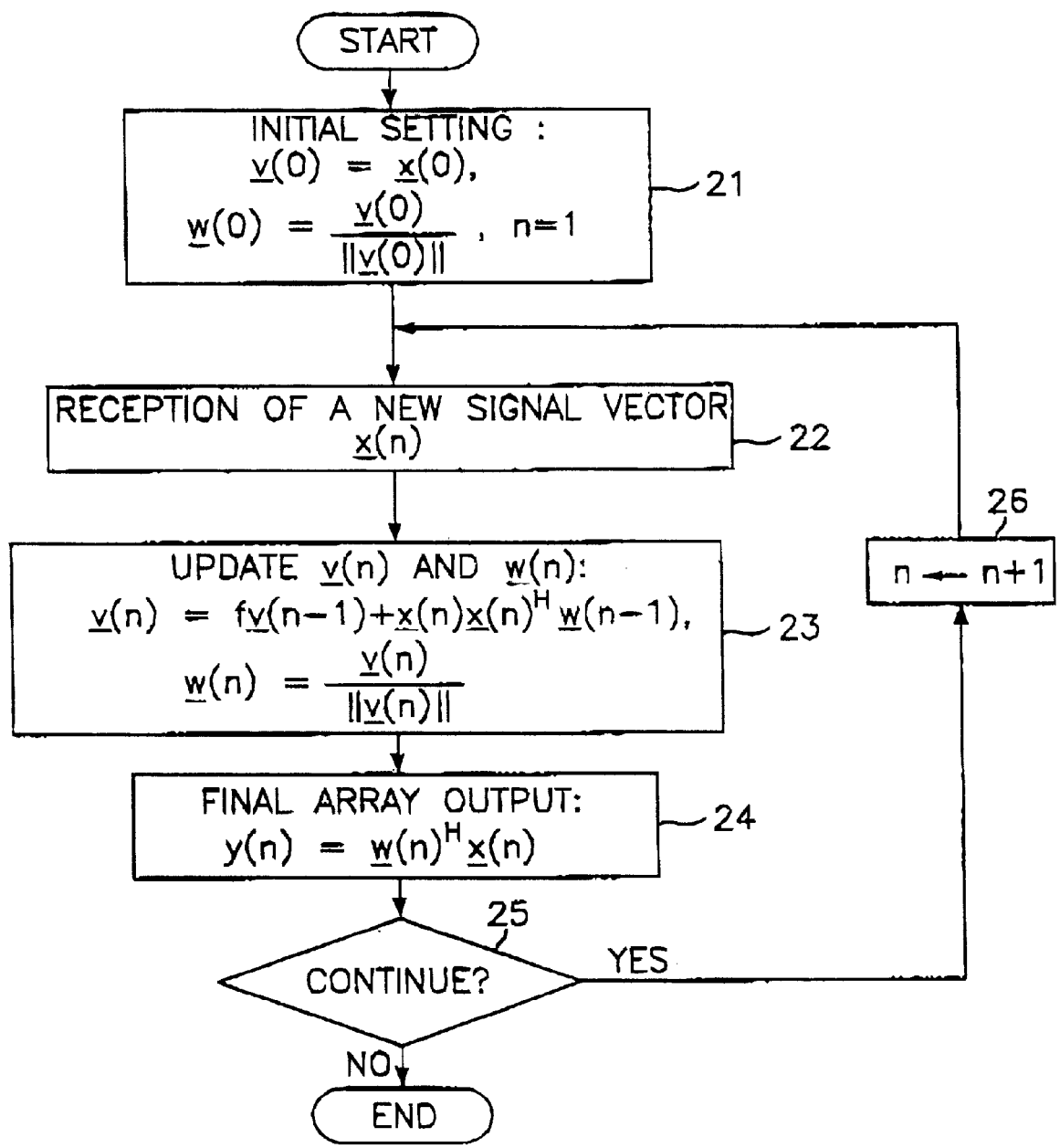
FIG. 2A is a flowchart that describes the four steps of computing the weight vector $\underline{w}$ according to the first embodiment of the inventive method.

FIG. 2A is a flowchart that describes the four steps of computing the weight vector $\underline{w}$ according to the first embodiment of the inventive method. The flowchart of FIG. 2A comprises the following steps. The initial estimation vector $\underline{x}(0)$ and the initial gain vector $\underline{w}(0)$ are set with the initial signal vector $\underline{x}(0)$ and the normalized estimation vector, i.e., $\underline{v}(0)=\underline{x}(0)$ and $$\underline{w}(0) = \frac{\underline{v}(0)}{\|\underline{v}(0)\|},$$

and set the snapshot index n with 1, i.e., n=1 (step 21). The new signal vector $\underline{x}(n)$ is received, at the present snapshot (step 22). The estimation vector $\underline{v}(n)$ and the gain vector $\underline{w}(n)$ are updated, from the new signal vector by $\underline{v}(n)=f\underline{v}(n-1)+(1-f)\underline{x}^H(n)\underline{w}(n-1)$ and $$\underline{w}(n) = \frac{\underline{v}(n)}{\|\underline{v}(n)\|},$$

respectively, where the forgetting factor f is properly set with a value between 0 and 1, i.e., $0 \leq f < 1$ (step 23). The final array output y(n) at the present snapshot is produced, by $y(n)=\underline{w}^H(n)\underline{x}(n)$ (step 24). Whether the signal processing is to be continued or not is checked (step 25). For continuing the procedure at the next snapshot, it goes back the step 22 to receive a new signal vector, with an incremented snapshot index n, i.e., n←n+1 (step 26).

Figure 2B:
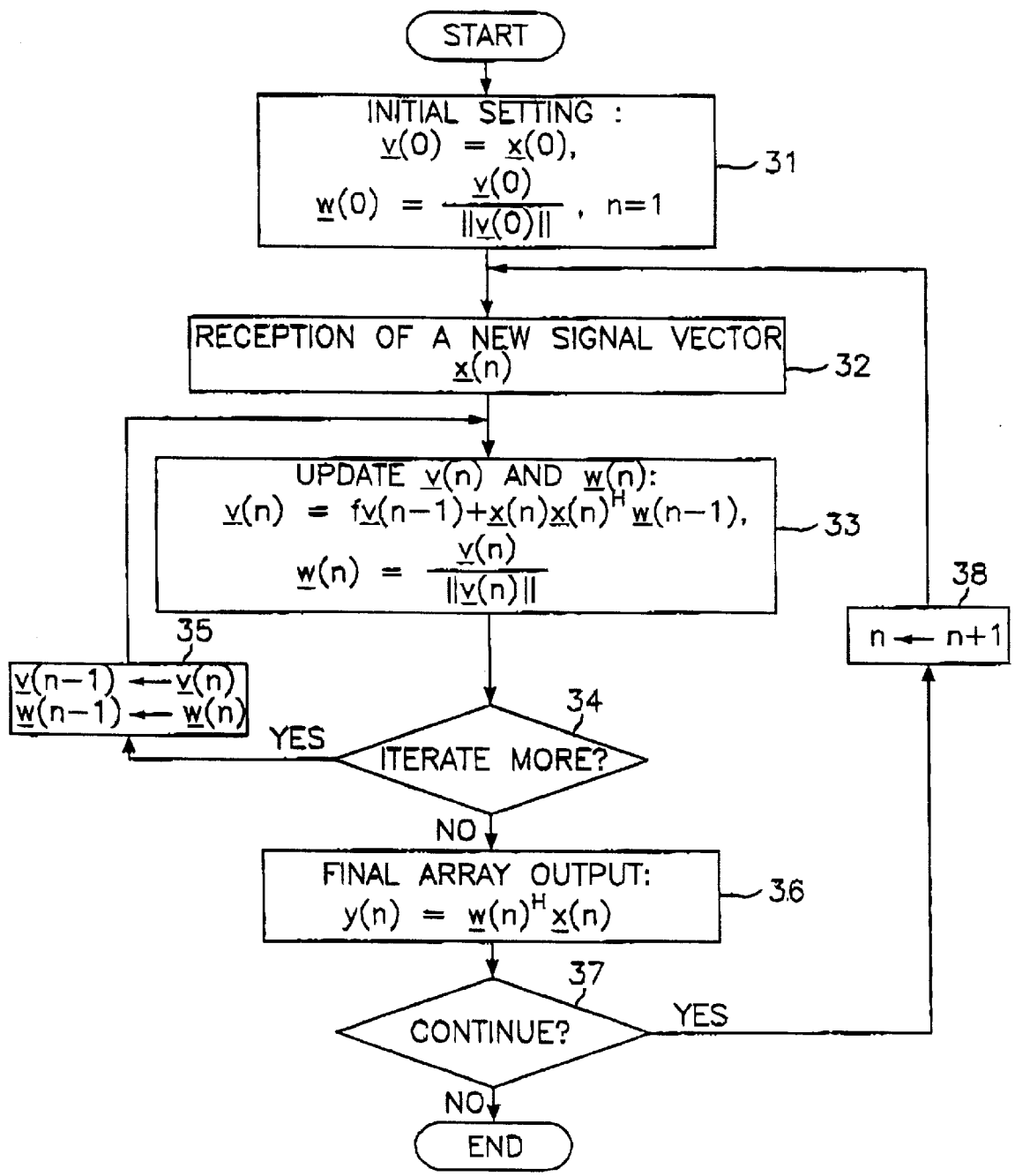
FIG. 2B is a flowchart that describes the six steps of computing the weight vector $\underline{w}$ according to the second embodiment of the inventive method.

FIG. 2B is a flowchart that describes the six steps of computing the weight vector $\underline{w}$ according to the second embodiment of the inventive method. The main difference between the methods shown in FIGS. 2A and 2B is that the target vector can be computed with repeated iterations at each snapshot in FIG. 2B, whereas the method shown in FIG. 2A generates the vector in a single iteration at each snapshot The flowchart of FIG. 2B comprises the following steps. The initial estimation vector $\underline{v}(0)$ and the initial gain vector $\underline{w}(0)$ are set with the initial signal vector $\underline{x}(0)$ and the normalized initial estimation vector, respectively, i.e., $\underline{v}(0)=\underline{x}(0)$ and $$\underline{w}(0) = \frac{\underline{v}(0)}{\|\underline{v}(0)\|},$$

and the snapshot index n is set with 1, i.e., n=1 (step 31).

A new signal vector $\underline{x}(n)$ is received, at the present snapshoht (step 32). The estimation vector $\underline{v}(n)$ and the gain vector $\underline{w}(n)$ are updated, (step 33), from the new signal vector $\underline{x}(n)$ by $\underline{v}(n)=f\underline{v}(n-1)+(1-n)\underline{x}^H(n)\underline{w}(n-1)$ and $$\underline{w}(n) = \frac{\underline{v}(n)}{\|\underline{v}(n)\|},$$

respectively, where the forgetting factor f is properly set with a value between 0 and 1, i.e., $0 \leq f < 1$. Whether or not more iteration is to be performed in the present snapshot is decided (step 33). Then, it goes to the following step 35 for more iteration in the present snapshot, or goes to the step 36 for no more iteration in the present snapshot. The estimation vector and weight vector are set (step 35), as $\underline{v}(n-1)\leftarrow\underline{v}(n)$ and $\underline{w}(n-1)\leftarrow\underline{w}(n)$, respectively, for more iteration in the present snapshot. The final array output y(n) at the present snapshot is generated (step 37), as $y(n)=\underline{w}^H(n)\underline{x}(n)$. And, whether the signal processing is to be continued or not is check. For continuing the procedure at the next snapshot, it goes back the step 32 to receive a new signal vector, with an incremented snapshot index n, i.e, n←n+1 (step 38).

Figure 2C:
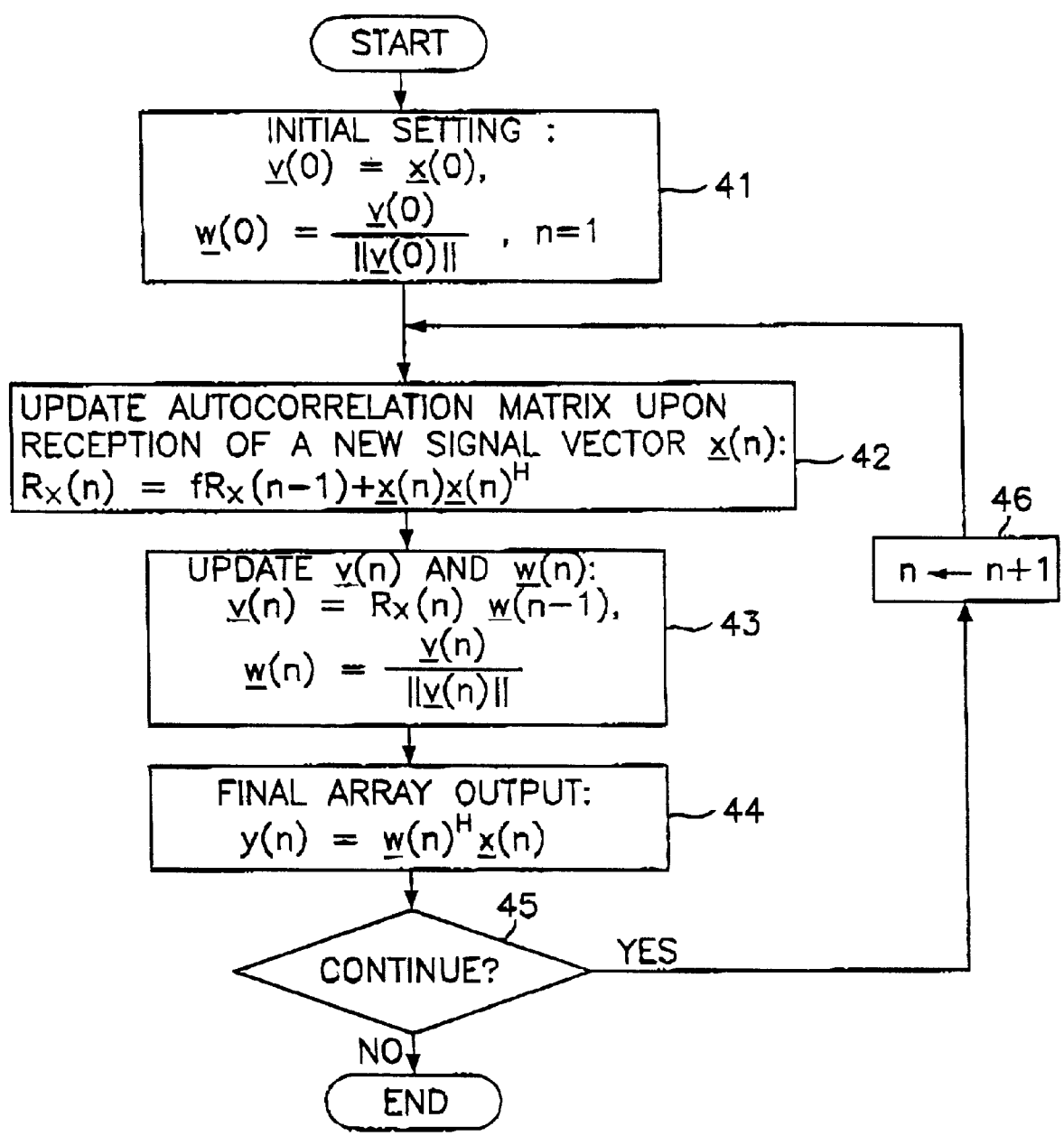
FIG. 2C is a flowchart that describes the four steps of computing the weight vector $\underline{w}$ according to the third embodiment of the inventive method.

FIG. 2C is a flowchart that describes the four steps of computing the weight vector $\underline{w}$ according to the third embodiment of the inventive method. The major difference of FIG. 2C compared to the previous two methods shown in FIG. 2A and FIG. 2B is that the autocorrelation matrix is computed in accordance with eq.(4) at each snapshot upon the reception of a new signal vector in the method introduced in FIG. 2C. On the other hand, in the methods described in FIGS. 2A and 2B the autocorrelation matix is not actually computed at each snapshot. Instead, the matrix is approximated with vector operations, as shown in eq.(13). Although the method shown in FIG. 2C requires more computation compared to that of FIG. 2A or FIG. 2B, it can result in more accuracy in computing the weight vector and final array output.

The flow chart of FIG. 2C comprises the following steps. The initial estimation vector $\underline{v}(0)$ and the initial gain vector $\underline{w}(0)$ are set with the initial signal vector $\underline{v}(0)$ and the normal estimation vector, respectively, i.e., $\underline{v}(0)=\underline{x}(0)$ and $$\underline{w}(0) = \frac{\underline{v}(0)}{\|\underline{v}(0)\|},$$

and the snapshot index n is set with 1, i.e., n=1 (step 41). The autocortelation matrix $\underline{R}(n)$ is updated, with a new signal vector $\underline{x}(n)$ received at the present snapshoht by $\underline{R}(n)=f \underline{R}_x(n-1)+(1-f)\underline{x}(n)\underline{x}^h(n)$ where the initial matrix is set with the initial signal vector by $\underline{R}_x(0)=\underline{x}(0)\underline{x}^H(0)$ and the forgetting factor f is properly set with a value between 0 and 1, i.e., $0 \leq f < 1$ (step 42). The estimation vector $\underline{v}(n)$ and gain vector $\underline{w}(n)$ are updated, from the new autocorrelation matrix by $\underline{v}(n)=\underline{R}_x(n)\underline{w}(n-1)$ and $$\underline{w}(n) = \frac{\underline{v}(n)}{\|\underline{v}(n)\|},$$

respectively (step 43). The final array output y(n) at the present snapshot is generated, (step 44), as $y(n)=\underline{w}^H(n)\underline{x}(n)$. And whether the signal processing is to be continued or not is checked (step 45). For continuing the procedure at the next snapshot, it goes back the step 42 to receive a new signal vector, with an incremented snapshot index n, i.e., n←n+1 (step 46).

Figure 2D:
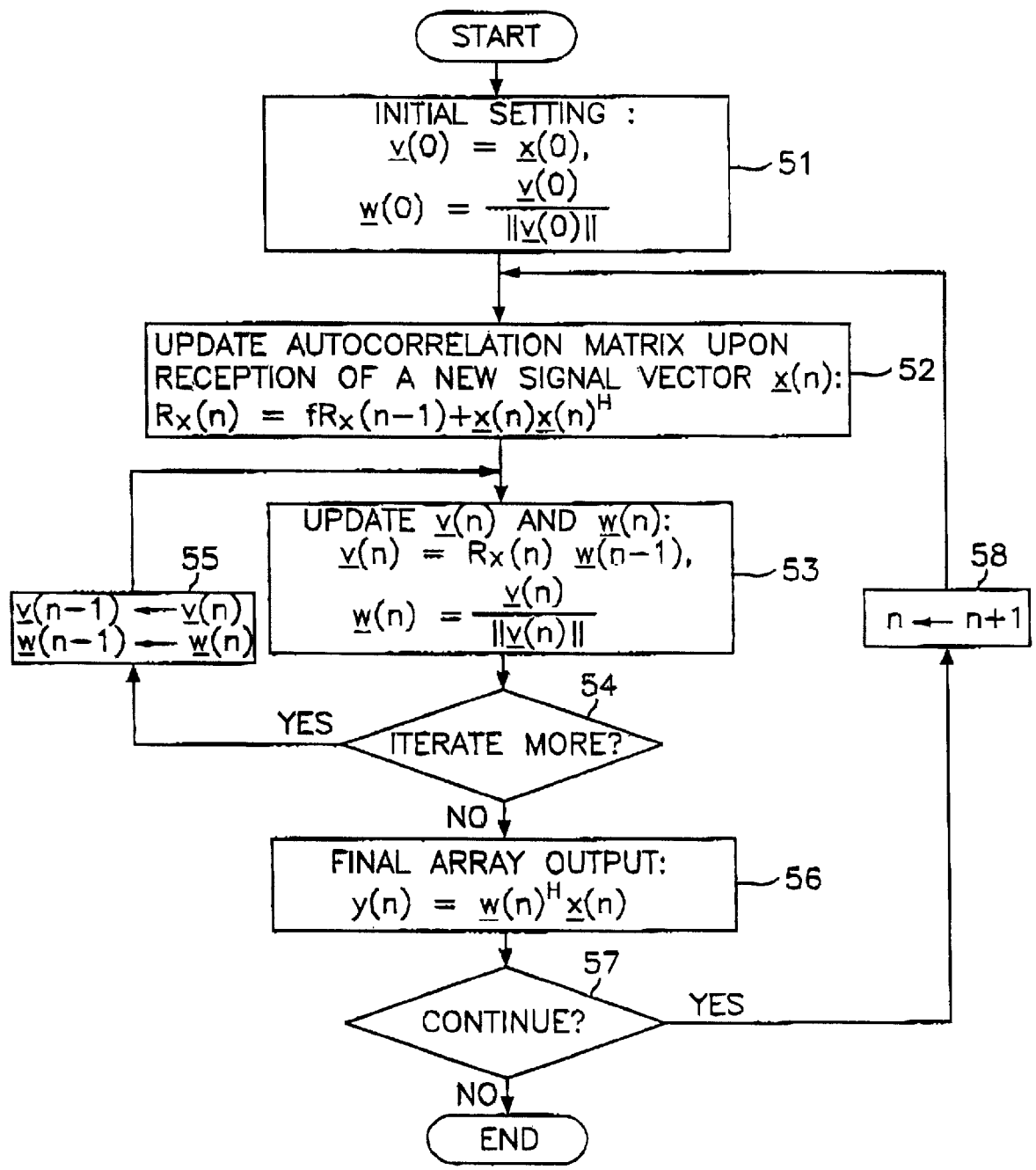
FIG. 2D is a flowchart that describes the six steps of computing the weight vector $\underline{w}$ according to the fourth embodiment of the inventive method.

FIG. 2D is a flowchart that describes the six steps of computing the weight vector $\underline{w}$ according to the fourth embodiment of the inventive method. The method described in FIG. 2D also computes the autocorrelation matrix at each snapshot, as shown in FIG. 2C. The major difference of the method shown in FIG. 2D compared to that of FIG. 2C is that repeated computation for the estimation vector and weight vector can be performed in the method described in FIG. 2D. Although the method shown in FIG. 2D requires more computation compared to the other methods introduced in this invention, the method described in FIG. 2D can result in the best accuracy in computing the weight vector and final array output.

The flowchart of FIG. 2D comprises the following steps. The initial estimation vector $\underline{v}(0)$ and initial gain vector $\underline{w}(0)$ are set with the initial signal vector $\underline{x}(0)$ and the normalized initial estimation vector, respectively, i.e., $\underline{v}(0)=\underline{x}(0)$ and $$\underline{w}(0) = \frac{\underline{v}(0)}{\|\underline{v}(0)\|},$$

and the snapshot index n is set with 1, i.e., n=1 (step 51). The autocorrelation matrix $R_x(n)$ is updated, with a new signal vector $\underline{x}(n)$ received at the present snapshoht by $\underline{R}_x(n)=f R_x(n-1)+(1-f)\underline{x}(n)\underline{x}^H(n)$, where the initial matrix is set with the initial signal vector by $\underline{R}_x(0)=\underline{x}(0)\underline{x}^H(0)$ and the forgetting factor f is properly set with a value between 0 and 1, i.e., $0 \leq f < 1$ (step 52). The estimation vector $\underline{v}(n)$ and gain vector $\underline{w}(n)$ are updated, from the new autocorrelation matrix by $\underline{v}(n)=\underline{R}_x(n)\underline{w}(n-1)$ and $$\underline{w}(n) = \frac{\underline{v}(n)}{\|\underline{v}(n)\|},$$

respectively (step 53). Whether or not more iteration is to be performed in the present snapshot is decided (step 54). Then, it goes to the following step 55 for more iteration in the present snapshot, or it goes to the step 56 for no more iteration in the present snapshot. The estimation vector and weight vector are set, as $\underline{v}(n-1) \leftarrow \underline{v}(n)$ and $\underline{w}(n-1) \leftarrow \underline{w}(n)$, respectively, for more iteration in the present snapshot (step 55).

The final array output y(n) at the present snapshot is generated, as $y(n)=\underline{w}^H(n) \underline{i}(n)$ (step 56). And, whether the signal processing is to be continued or not is checked (step 57). For continuing the procedure at the next snapshot, it goes back the step 52 to receive a new signal vector, with an incremented snapshot index n, i.e., n←n+1 (step 58).

FIG. 3 illustrates the performances of the antenna array system designed by the method presented in this invention. FIG. 3A shows the number of clocks required to obtain the target weight vector by utilizing a microprocessor. In the simulations for the data of FIG. 3A, a digital signal processor, for example TMS320C30, has been selected arbitrarily. The required number of clocks in FIG. 3A is shown in comparison to another technique, namely a modified conjugate gradient method, that has been developed most recently. FIG. 3B shows the SIR and SNR performances of the antenna array system designed by the method presented in this invention.

As illustrated in the figure, the proposed system provides about 8 dB improvement in SIR. The SNR is, as mentioned earlier, improved linearly as the number of antenna elements in the array increases. From the performances shown in FIG. 3, it is apparent that the antenna array system designed by the proposed method is excellent in terms of both performance and complexity.

As mentioned earlier, the signal processing method provided in this invention gives the following advantages: first, the communication capacity is increased as much as the SIR are increased, and second, the communication quality is enhanced as much as the SNR and the SIR is increased.

The best feature of the proposed technique in this invention is that the required amount of computation to achieve all the merits is extremely small so that the proposed technique can be easily implemented with the normal digital signal processor in real-time processing. The simplicity of the proposed method, as shown in FIG. 3, does not cause any sacrifice in accuracy compared to conventional methods.

Although the specific embodiments of the present invention have been disclosed and described, it is apparent that those who skilled in the art will appreciate that various modifications, additions and substitutions are possible, without departing from the scope and the spirit of the present invention as disclosed in the accompanying claims. Therefore, it should be understood that the present invention is not limited to the particular embodiment disclosed herein as the best mode contemplated for carrying out the present invention.

What is claimed is:

1. A signal processing method for minimizing interference and for reducing effects of noise by controlling beam patterns of a telecommunication system having an antenna array, comprising the steps of:

(a) setting an initial estimation vector with an initial signal vector, setting an initial weight vector with normalized said estimation vector, and setting an initial snapshot index;

(b) receiving a new signal vector at the present snapshoht;

(c) updating said estimation vector and computing said weight vector by normalizing said estimation vector; and (d) producing a final array output at the present snapshot by computing an Euclidean inner product between the weight vector and the signal vector.

2. The signal processing method according to claim 1, further comprising the step of (e) going back said step (b) to receive a new signal vector, with an incremented snapshot index, for continuing the procedure at a next snapshot.

3. The signal processing method according to claim 1, wherein said step of (c) updating said weight vector comprises the substeps of:

(c-1) multiplying each element of said estimation vector obtained at a last previous snapshot by a forgetting factor of which the value is predetermined to be in 0 to 1;

(c-2) multiplying each element of complex conjugate of said signal vector received at the present snapshot by that of said weight vector computed during the last snapshot, and adding up all the results of the multiplications;

(c-3) multiplying each element of said signal vector of the present snapshot by the result of said substep (c-2);

(c-4) obtaining the updated estimation vector by adding each corresponding element of the results of said substeps (c-1) and (c-3); and (c-5) determining said weight vector by dividing each element of said updated estimation vector, by a magnitude of said updated estimation vector.

4. The signal processing method according to claim 3, wherein said substep (c-1) comprises the following substeps of:

(c-1a) multiplying each element of said weight vector obtained at the last previous snapshot by said forgetting factor of which the value is predetermined to be in 0 to 1; and (c-1b) multiplying each element of the results of said substep (c-1a) by the magnitude of said estimation vector obtained at the last previous snapshot.

5. The signal processing method according to claim 1, wherein said weight vector is determined by multiplying a predetermined constant on each element of said estimation vector obtained in said step (c), in order to modify said weight vector without changing the beam-pattern characteristics of said estimation vector obtained in said step (c).

6. The signal processing method according to claim 1, wherein said weight vector is determined by dividing each element of said estimation vector by the first element of said estimation vector obtained in said step (c), such that the signal received from a reference antenna element is always multiplied by a real-valued gain.

7. The signal processing method according to claim 6, wherein said weight vector is determined by normalizing the result of the division, such that the magnitude of the final resultant weight vector is 1.

8. The signal processing method according to claim 7, wherein said reference antenna element is determined by an antenna element of which the phase of said signal is the latest of all said antenna elements in said antenna array at the present snapshot.

9. The signal processing apparatus according to claim 7, wherein said reference antenna element is determined by said antenna element of which the physical distance from a signal source to be communicated with at the present snapshot is farthest compared to the other antenna elements in said antenna array.

10. The signal processing method according to claim 1, further comprising the step of (e) going back to said step (c), with an updated weight vector substituting for the previous weight vector, for more iteration in the present snapshot.

11. The signal processing method according to claim 2, further comprising the step of (f) going back to said step (c), with an updated weight vector substituting for the previous weight vector, for more iteration in the present snapshot.

12. A signal processing method for minimizing interference and for reducing effects of noise by controlling beam patterns of a telecommunication system having an antenna array, comprising the steps of:

(a) setting an initial estimation vector with a signal vector received at initial snapshot, setting an initial weight vector with a normalized estimation vector, and setting an initial snapshot index;

(b) updating an autocorrelation matrix with a new signal vector received at a present snapshot, where an initial matrix is set with the initial signal vector and a forgetting factor is set with a value between 0 and 1;

(c) updating the estimation vector and the weight vector from the new autocorrelation matrix, respectively; and (d) producing a array output at the present snapshot by computing an Euclidean inner product between the weight vector and the signal vector.

13. The signal processing method according to claim 12, further comprising the step of (e) going back said step (b) to receive a new signal vector, with an incremented snapshot index, for continuing the procedure at a next snapshot.

14. The signal processing method according to claim 12, wherein said weight vector is determined by multiplying a predetermined constant on each element of said estimation vector obtained in said step (c), in order to modify said weight vector without changing the beam-pattern characteristics of said estimation vector obtained in said step (c).

15. The signal processing method according to claim 12, wherein said weight vector is determined by dividing each element of said estimation vector by the first element of said estimation vector obtained in said step (c), such that the signal received from a reference antenna element is always multiplied by a real-valued gain.

16. The signal processing method according to claim 15, wherein said weight vector is determined by normalizing the result of the division, such that the magnitude of the final resultant weight vector is 1.

17. The signal processing method according to claim 16, wherein said reference antenna element is determined by an antenna element of which the phase of said signal is the latest of all said antenna elements in said antenna array at the present snapshot.

18. The signal processing apparatus according to claim 16, wherein said reference antenna element is determined by said antenna element of which the physical distance from a signal source to be communicated with at the present snapshot is farthest compared to the other antenna elements in said antenna array.

19. The signal processing method according to claim 12, further comprising the step of (f) going back to said step (c), with an updated weight vector substituting for the previous weight vector, for more iteration in the present snapshot.

20. The signal processing method according to claim 13, further comprising the step of (g) going back to said step (c), with an updated weight vector substituting for the previous weight vector, for more iteration in the present snapshot.

* * * * *